Feb. 27, 1923.
S. L. SISTI.
RESILIENT WHEEL.
FILED AUG. 6, 1921.
1,446,939.
2 SHEETS—SHEET 2.
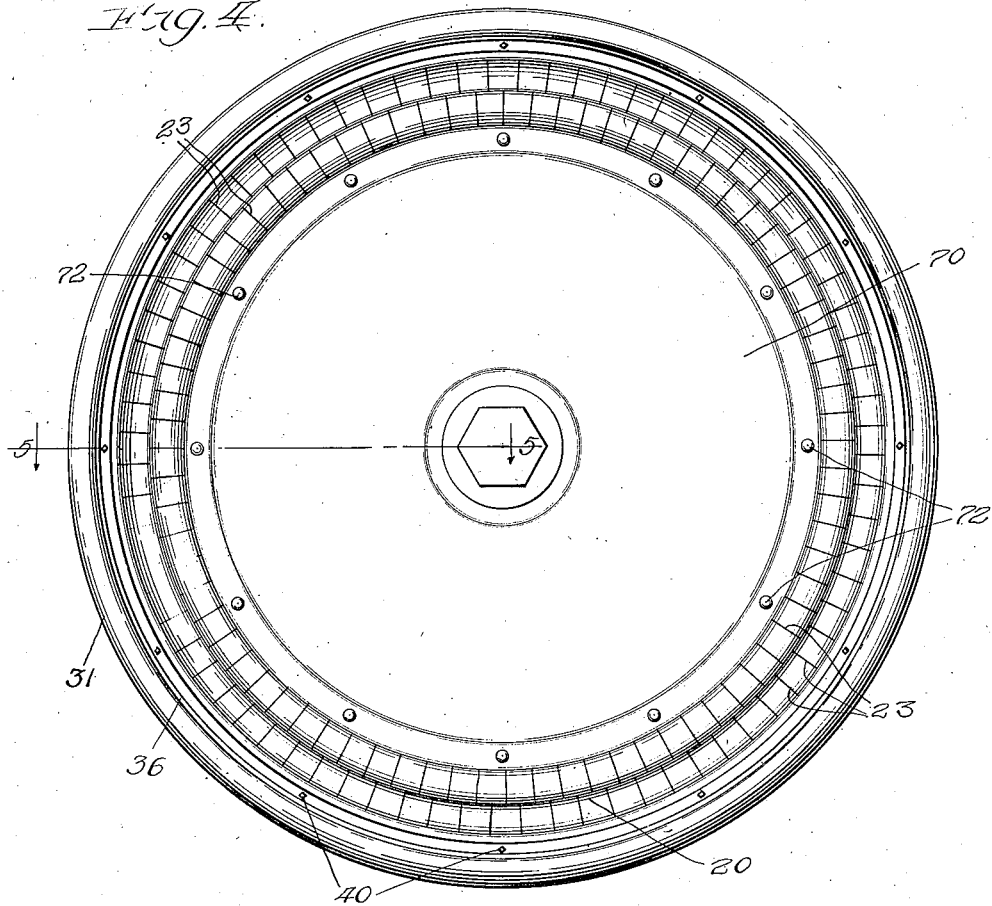
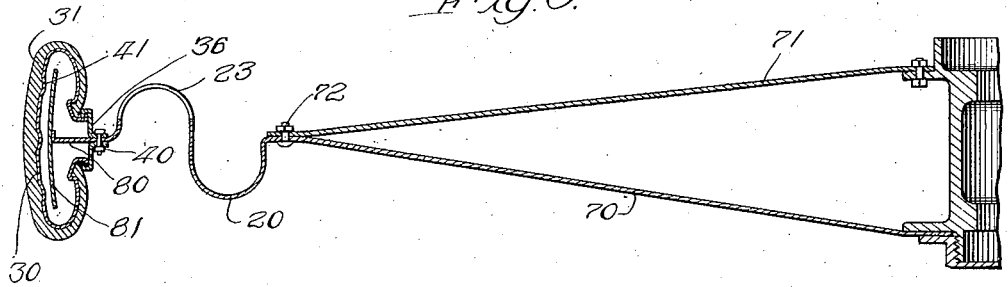
Inventor,
Salvatore L. Sisti, Patented Feb. 27, 1923.

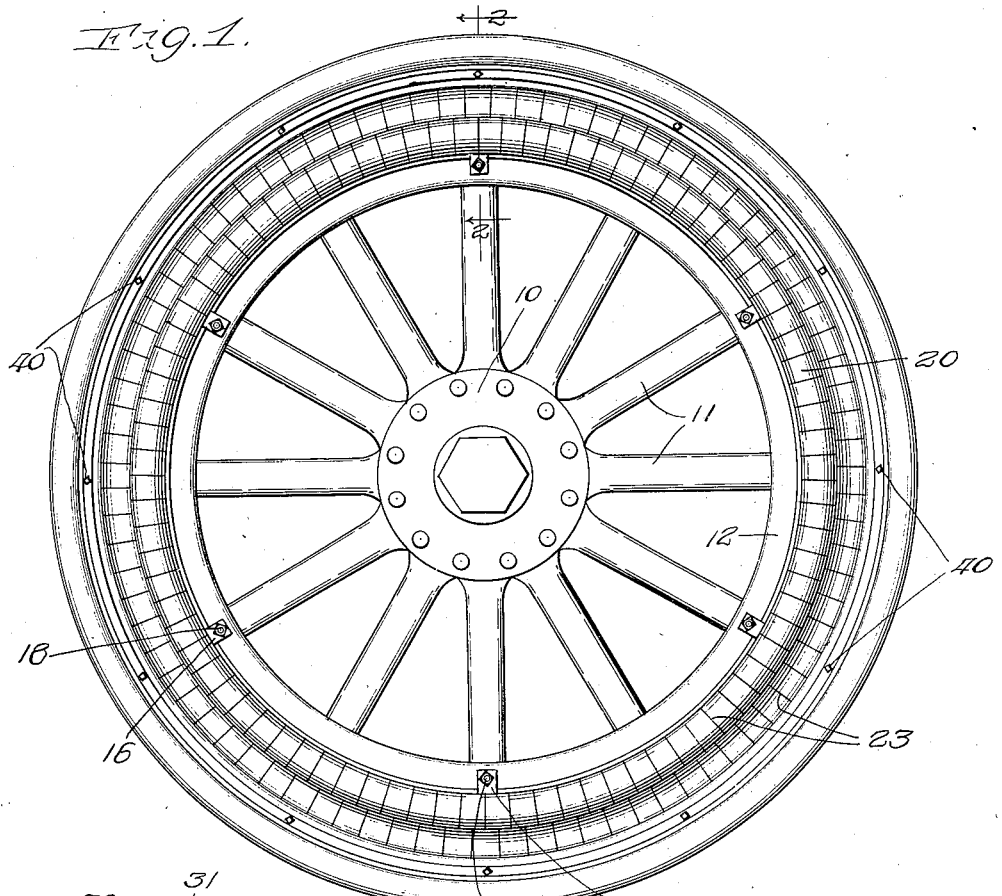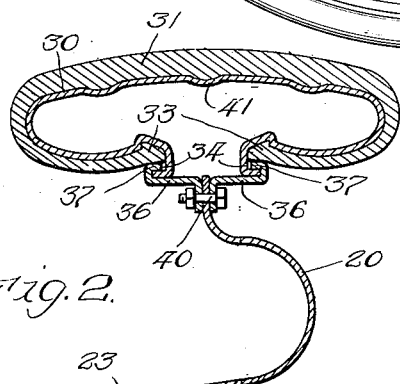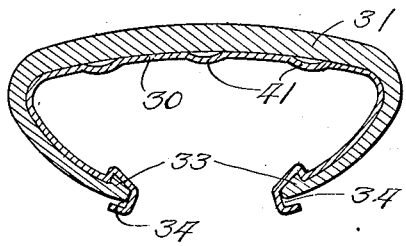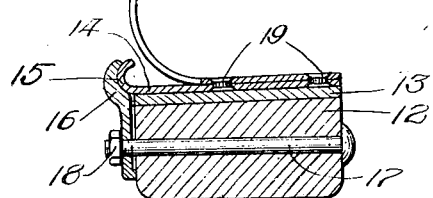

1,446,939

UNITED STATES PATENT OFFICE.

SALVATORE LEO SISTI, OF CHICAGO, ILLINOIS.

RESILIENT WHEEL.

Application filed August 6, 1921. Serial No. 490,304.

*To all whom it may concern:*

Be it known that I, SALVATORE L. SISTI, a citizen of the United States, residing at Chicago, in the county of Cook and State of Illinois, have invented a new and useful Improvement in Resilient Wheels, of which the following is a specification.

This invention relates to improvements in resilient wheels, and more especially to a resilient wheel adapted for use on motor vehicles and the like. The invention will be fully understood from the following specification and accompanying drawings, in which:

Figure 1 is a view of a device embodying the features of my invention, Figure 2 is a view taken as indicated by the line 2 of Fig. 1, Figure 3 is a view similar to Fig. 2 showing the tread part removed from the wheel, Figure 4 is a view similar to Fig. 1 showing a modified form, and Figure 5 is a view taken as indicated by the line 5 of Fig. 4.

As shown in the drawings, 10 indicates the hub of a wheel, 11 the spokes, and 12 the felloe. Shrunk on the felloe or otherwise fastened is a metal band 13. The felloe 12 and band 13 are slightly tapered to make the circumference of the wheel at the outer edge slightly smaller than the inner edge. The parts just described may be of any well known construction, and form no part of the present invention. For example, they may be of the ordinary type adapted for receiving a detachable rim upon which is mounted a pneumatic tire. The other parts of my resilient wheel are adapted to be fastened on in a manner similar to the manner in which such a detachable rim is mounted.

A metal rim 14, slightly tapered, is made to fit snugly on the band 13. The outer edge of the rim 14 is turned outwardly and curved inwardly as indicated by 15. The rim 14 is adapted to be held in place on the band 13 by the lugs 16 which may be of any desired construction, such as are ordinarily used for holding in place detachable rims. As here shown, they are held in place by bolts 17 extending through the felloe 12. By loosening the nuts 18, the lugs 16 may be freed from the outwardly turned edge of the rim 14 and rotated, in order to permit removal of the rim 14. Mounted on the rim 14 by means of the rivets 19 is a spring member 20, preferably formed from a circular flat ring of metal. The flat ring is given two annular corrugations or bends, the two bends being reversed with respect to each other, so that a cross section of the ring resembles the letter S (reversed as shown in Fig. 2). The two corrugations or bends in the spring member 20 are each provided with a series of radial slots 23 extending throughout the entire circumference of the wheel. The slots 23 do not however extend through the horizontal (as shown in Fig. 2) part of the member lying between the two bends; and the slots in one bend are preferably staggered with respect to those in the other.

Mounted on the outer edge of the spring member 20 is a tread part 30 carrying a rubber or leather shoe 31. The part 30 is made of spring metal in the form shown, and tends to open as shown in Fig. 3, when removed from the spring part 20. The shoe 31 may be formed of rubber and canvas as are the shoes now generally in use forming the outer coverings for pneumatic tires. Such shoes are provided ordinarily with slightly thickened beads 33 which are adapted to lie in the corresponding grooves 34 formed on the edge of the part 30. Two clamping rings 36 are provided for fastening the tread part to the spring part. The rings 36 have inwardly turned edges 37 adapted to lie in the grooves 34 of the tread part as shown in Fig. 2. The other edges of the rings 36 are turned downwardly (as viewed in Fig. 2) and provided with holes adapted to receive the bolts 40. The outer edge of the spring part 20 is provided with corresponding holes through which the bolts 40 extend. In mounting the tread part 30 on the spring part 20, the shoe 31 is placed in position when the tread part 30 is open as shown in Fig. 3, and the beads 33 are placed in the grooves 34. The edges 37 of the rings 36 are then hooked into the grooves 34, and when so hooked, they hold the beads 33 in place, and prevent their pulling out. The other edges of the rings 36 are then brought together until they are close to the outer edge of the spring part 20, one of the rings lying on each side of such part. The bolts 40 are then put in place and the nuts tightened up, in order to draw the rings 36 together to clamp the outer edge of the spring part 20 firmly between. This drawing together of the rings 36, also serves to bend the tread part 30 into the position shown in Fig. 2 and to tighten the shoe 31 thereupon. The tread part 30 is also provided on its tread surface with indentations 41 in which the shoe 31 is forced in order to prevent creeping and slipping of the shoe 31 on the tread part. The curves or corrugations in the spring part 20 furnish a springing and resilient connection between the tread part 30 and rim 14.

In Figs. 4 and 5 I have shown a modified form of device showing a disk wheel. In the preferred form my improved resilient wheel is shown as being made up from a hub, spokes and felloe of the ordinary type now in general use in connection with pneumatic tires mounted on detachable rims. In the modified form, however, the entire wheel is made up to embody the features of my invention. The spring part, tread part and clamping rings are the same as in the preferred form, except that in this form I have shown the spring part 20 as projecting slightly up into the tread part as indicated by 80 and carrying on its edge a band 81, thus forming a member having a T cross section within the tread part 41. This T member is designed to give additional strength and support to the tread part. The spring part, however, is not mounted on a detachable rim 14. In this modified form the spring part 20 is formed on the outer part of a flat disk instead of a ring. The inner part of the disk, as indicated by 70, forms one of the center disks of the wheel. The wheel is reinforced by another disk 71 having its outer edge bolted by means of the bolts 72, to the outer edge of the disk 70.

While I have shown and described but certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent is:

1. A resilient wheel having a spring part arranged between the tread and the felloe, said spring part comprising a ring with two annular bends, and radial slots cut through each of said bends, the slots in one bend being staggered with respect to those in the other bend.

2. A resilient wheel having a spring part arranged between the tread and the felloe, said spring part comprising a ring with two annular concentric bends, and radial slots cut through each of said bends, the radial slots in one bend being staggered with respect to those in the other bend.

3. A resilient wheel having a spring part arranged between the tread and the felloe, said spring part comprising a ring with two annular concentric and reversely disposed bends, and radial slots cut through each of said bends, the slots in one of said bends being staggered with respect to those in the other bend.

In testimony whereof, I have hereunto set my hand and seal this 4 day of August 1921.

SALVATORE LEO SISTI. [L. S.]